(12) United States Patent
Kasahara

(10) Patent No.: US 11,199,687 B2
(45) Date of Patent: Dec. 14, 2021

(54) DRY OBJECTIVE

(71) Applicant: OLYMPUS CORPORATION, Hachioji (JP)

(72) Inventor: Takashi Kasahara, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 398 days.

(21) Appl. No.: 16/284,842

(22) Filed: Feb. 25, 2019

(65) Prior Publication Data

US 2019/0324247 A1 Oct. 24, 2019

(30) Foreign Application Priority Data

Apr. 19, 2018 (JP) .............................. JP2018-080946
Dec. 19, 2018 (JP) .............................. JP2018-237017

(51) Int. Cl.
*G02B 21/02* (2006.01)
*G02B 9/14* (2006.01)

(52) U.S. Cl.
CPC .............. *G02B 21/02* (2013.01); *G02B 9/14* (2013.01)

(58) Field of Classification Search
CPC ...... G02B 21/02; G02B 21/33; G02B 23/243; G02B 9/12; G02B 13/003; G02B 1/041; G02B 3/00; G02B 7/008; G02B 7/028; G02B 21/025; G02B 13/18; G02B 21/22; G02B 27/4211; G02B 3/02; G02B 9/10; G02B 9/34; G02B 13/0025; G02B 13/006; G02B 13/02; G02B 13/04; H01L 2924/00;

(Continued)

(56) References Cited

U.S. PATENT DOCUMENTS 5,729,391 A 3/1998 Ito
5,920,432 A 7/1999 Suenaga et al.
(Continued)

FOREIGN PATENT DOCUMENTS

JP H08136816 A 5/1996
JP H09222565 A 8/1997
(Continued)

OTHER PUBLICATIONS

Extended European Search Report (EESR) dated Sep. 25, 2019 issued in European Application No. 19159316.9.

*Primary Examiner* — William R Alexander
*Assistant Examiner* — Sharrief I Broome
(74) *Attorney, Agent, or Firm* — Holtz, Holtz & Volek PC

(57) ABSTRACT

A dry objective includes: first lens group that includes a plurality of meniscus lens components and has a positive power; a second lens group that includes a cemented lens, turns a pencil of diverging light from the first lens group into a pencil of converging light, and has a positive power; and a third lens group that includes a front group and a rear group and has a negative power, the front and rear groups having concave surfaces adjacent to and facing each other. The dry objective satisfies the following conditional expression:

$$0.43 \le (hg_2 - hg_1)/gt_1 \le 0.9 \qquad (1)$$

where $gt_1$ indicates a thickness that a lens component of the rear group that is the closest to the object has on an optical axis; $hg_1$ and $hg_2$, the heights of an axial marginal light ray at the lens surface of the lens component that is the closest to the object and an image.

20 Claims, 11 Drawing Sheets

(58) Field of Classification Search
CPC . H01L 2924/12033; H01L 2924/12041; H01L 2924/12042; H01L 2924/12043; H01L 2924/14; H01L 2924/181; H01L 27/14625; H01L 2224/16225; H01L 2224/16245; H01L 24/50; H01L 25/0756; H01L 25/13; H01L 2924/1815; H01L 2924/3011; H01L 31/02325; H01L 33/58; H01L 33/60; H01L 21/32135; H01L 21/67069; B01L 2300/0654; B01L 2300/0816; B01L 2300/0887; G11B 7/1374; G11B 2007/13727; G11B 7/13922; G11B 7/1387; G11B 2007/0006; G11B 7/122; G11B 7/1353; G11B 7/1378; G11B 2007/0013; G11B 7/121; G11B 7/1275; G11B 7/1367; G11B 7/1369; G11B 7/1376; G11B 7/1392; G11B 7/13925; G11B 7/22
See application file for complete search history.

(56) References Cited

U.S. PATENT DOCUMENTS

| | | | |
|---|---|---|---|
| 2010/0091101 A1* | 4/2010 | Fujimoto | G02B 21/02 348/79 |
| 2010/0165474 A1* | 7/2010 | Yonetani | G02B 21/02 359/661 |
| 2010/0177404 A1 | 7/2010 | Fujimoto | |
| 2013/0222920 A1 | 8/2013 | Fujita | |
| 2016/0116724 A1* | 4/2016 | Abe | G02B 21/33 359/656 |

FOREIGN PATENT DOCUMENTS

| | | |
|---|---|---|
| JP | H10213750 A | 8/1998 |
| JP | 2007133071 A | 5/2007 |
| JP | 2010134218 A | 6/2010 |
| JP | 2010186162 A | 8/2010 |
| JP | 2013178309 A | 9/2013 |

* cited by examiner

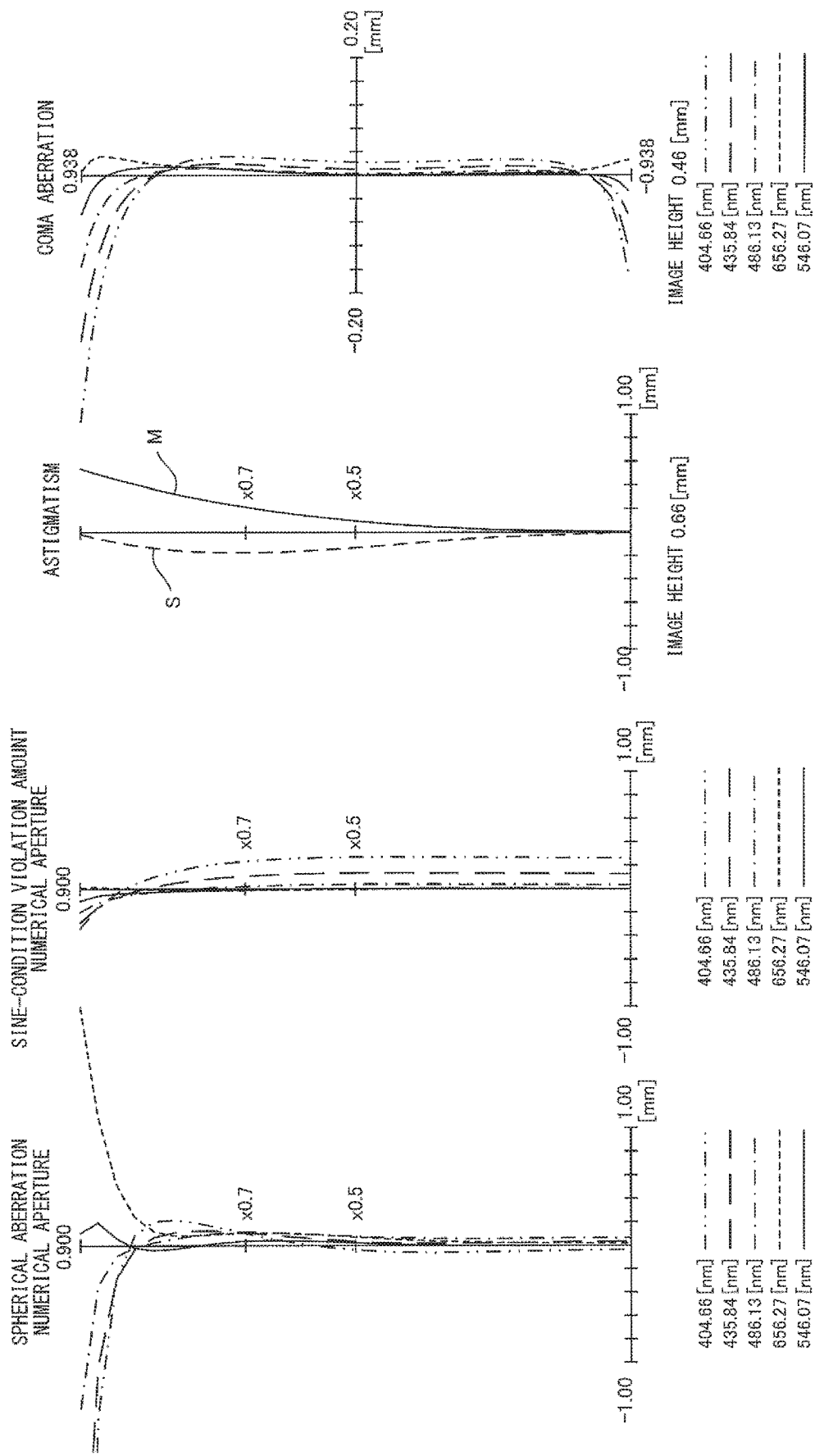

DRY OBJECTIVE

CROSS REFERENCE TO RELATED APPLICATIONS

This application is based upon and claims the benefit of priority from prior Japanese Patent Applications No. 2018-080946, filed Apr. 19, 2018, and No. 2018-237017, filed Dec. 19, 2018, the entire contents of which are incorporated herein by this reference.

BACKGROUND OF THE INVENTION

Field of the Invention

The disclosure herein relates to a dry objective.

Description of the Related Art

In recent years, there has been significant development in the pixel count for image sensors, and in the field of microscopes, microscope apparatuses have been increasingly expected to allow observation and image capturing to be performed with both a wide field of view and a high resolution. Such microscope apparatuses are required to include an objective that has a high numerical aperture (hereinafter referred to as NA) and that achieves a high aberration performance over a wide field of view. An objective used for a biological microscope will desirably accommodate a fluorescence observation based on excitation with a broadband ranging from a short wavelength of about 400 nm to a near-infrared wavelength. In addition, the objective will desirably be a dry objective in consideration of the usability in observations.

A dry objective in accordance with the prior art that has a high NA is described in, for example, Japanese Laid-open Patent Publication No. 2010-186162.

SUMMARY OF THE INVENTION

An objective in accordance with an aspect of the present invention is a dry objective with a 30-fold magnification or lower and a numerical aperture of 0.75 or higher that includes: a first lens group that includes a plurality of meniscus lens components and has a positive refractive power; a second lens group that includes a cemented lens, turns a pencil of diverging light from the first lens group into a pencil of converging light, and has a positive refractive power; and a third lens group that includes a front group and a rear group and has a negative refractive power, the front and rear groups having concave surfaces adjacent to and facing each other, wherein an object, the first lens group, the second lens group, and the third lens group are arranged in this order. The objective satisfies the following conditional expression:

$$0.43 \leq (hg_2 - hg_1)/gt_1 \leq 0.9 \tag{1}$$

where $gt_1$ indicates a thickness that the lens component of the rear group that is the closest to the object in the rear group has on an optical axis; $hg_1$, the height of an axial marginal light ray at the lens surface of the lens component that is the closest to the object in the lens component; $hg_2$, the height of the axial marginal light ray at the lens surface of the lens component that is the closest to an image in the lens component.

An objective in accordance with another aspect of the present invention is a dry objective with a 30-fold magnification or lower and a numerical aperture of 0.75 or higher, the dry objective comprising: a first lens group that includes a plurality of meniscus lens components and has a positive refractive power; a second lens group that includes a cemented lens, turns a pencil of diverging light from the first lens group into a pencil of converging light, and has a positive refractive power; and a third lens group that includes a front group and a rear group and has a negative refractive power, the front and rear groups having concave surfaces adjacent to and facing each other, wherein an object, the first lens group, the second lens group, and the third lens group are arranged in this order. The objective satisfies the following conditional expression:

$$57.6 \leq vd_1 \leq 87.3 \tag{5}$$

where $vd_1$ indicates an Abbe number that a lens of the dry objective that is closest to the object has for a d line.

BRIEF DESCRIPTION OF THE DRAWINGS

The present invention will be more apparent from the following detailed description when the accompanying drawings are referenced.

FIGS. 3A-3D are each an aberration diagram for an optical system that includes an objective 1 and a tube lens 10, wherein FIG. 3A is a spherical aberration diagram, FIG. 3B illustrates a sine-condition violation amount, FIG. 3C is an astigmatism diagram, and FIG. 3D is a coma aberration diagram for an image height ratio of 0.7;

FIGS. 5A-5D are each an aberration diagram for an optical system that includes an objective 2 and a tube lens 10, wherein FIG. 5A is a spherical aberration diagram, FIG. 5B illustrates a sine-condition violation amount, FIG. 5C is an astigmatism diagram, and FIG. 5D is a coma aberration diagram for an image height ratio of 0.7;

FIGS. 7A-7D are each an aberration diagram for an optical system that includes an objective 3 and a tube lens 10, wherein FIG. 7A is a spherical aberration diagram, FIG. 7B illustrates a sine-condition violation amount, FIG. 7C is an astigmatism diagram, and FIG. 7D is a coma aberration diagram for an image height ratio of 0.7;

FIGS. 9A-9D are each an aberration diagram for an optical system that includes an objective 4 and a tube lens 10, wherein FIG. 9A is a spherical aberration diagram, FIG. 9B illustrates a sine-condition violation amount, FIG. 9C is an astigmatism diagram, and FIG. 9D is a coma aberration diagram for an image height ratio of 0.7;

FIGS. 11A-11D are each an aberration diagram for an optical system that includes an objective 5 and a tube lens 10, wherein FIG. 11A is a spherical aberration diagram, FIG. 11B illustrates a sine-condition violation amount, FIG. 11C is an astigmatism diagram, and FIG. 11D is a coma aberration diagram for an image height ratio of 0.7.

DESCRIPTION OF THE EMBODIMENTS

Figure 1:
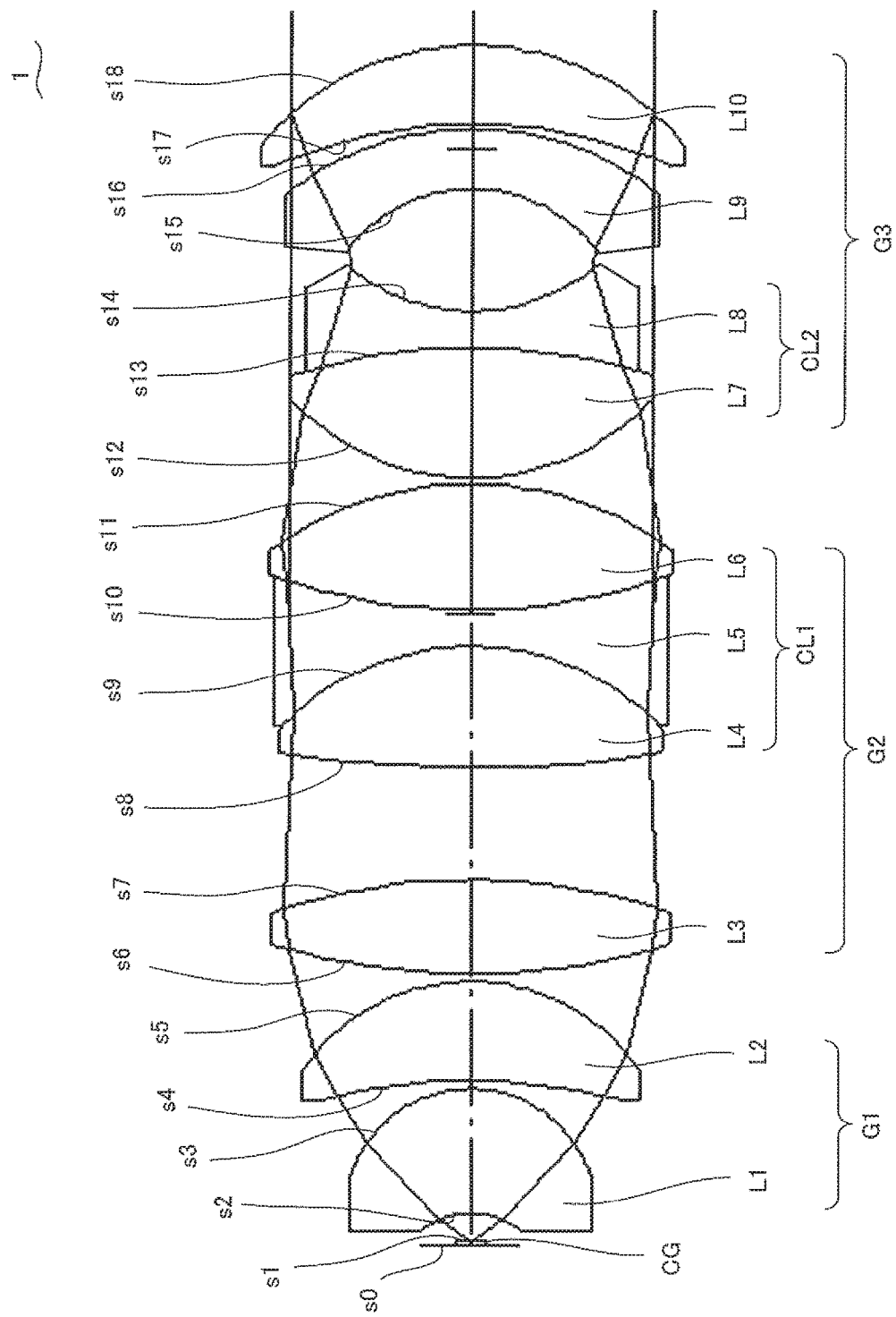
FIG. 1 is a cross-sectional view of an objective 1 in accordance with a first embodiment of the invention.

The objective described in Japanese Laid-open Patent Publication No. 2010-186162 is insufficient to correct axial chromatic aberrations and off-axis aberrations such as field curvatures and coma aberrations. Hence, it would be difficult for the objective to achieve a high performance with a wide wavelength region for a wide field of view.

The following describes an objective in accordance with an embodiment of the present application. The objective in accordance with the embodiment (hereinafter simply referred to as an objective) is an infinity-corrected microscope objective used in combination with a tube lens. The objective is what is called a dry objective and is used to observe a sample with air between the sample and the objective.

The objective has a 30-fold magnification or lower and a numerical aperture of 0.75 or higher. The objective includes a first lens group that has a positive refractive power, a second lens group that has a positive refractive power, and a third lens group that has a negative refractive power, wherein an object, the first lens group, the second lens group, and the third lens group are arranged in this order.

The first lens group includes a plurality of meniscus lens components. The lens component of the second lens group that is the closest to the object the second lens group is not a meniscus-lens component. The second lens group includes at least one cemented lens and turns a pencil of diverging light from the first lens group into a pencil of converging light. The third lens group includes a front group and a rear group, the front and rear groups having concave surfaces adjacent to and facing each other, wherein the object, the front group, and the rear group are arranged in this order. The front group is consisting of a single lens component.

A pencil of light herein refers to a pencil of light ray emitted from one point of an object (object point). Whether a single lens or a cemented lens, a lens component refers to one lens block that includes lens surfaces through which a light ray from an object point passes, wherein only a surface on an object side and a surface on an image side among these lens surfaces, i.e., only two of these lens surfaces, are in contact with air (or immersion liquid).

The first and second lens groups gradually refract and turn a pencil of diverging light from an object point into a pencil of converging light and causes the pencil of converging light to be incident on the third lens group. The third lens group turns the pencil of converging light from the second lens group into a pencil of diverging light by using concave surfaces adjacent to and facing each other that have a high negative refractive power. Then, the third lens group turns the pencil of diverging light into a pencil of parallel light and emits the pencil of parallel light.

As described above, the first and second lens groups gradually refract and turn a pencil of diverging light from an object point into a pencil of converging light and causes the pencil of converging light to be incident on the third lens group. Hence, the height of a marginal light ray within the third lens group can be made less than that within the second lens group. This allows a Petzval sum to be corrected effectively by the third lens group that has a negative refractive power. As a result, a field curvature can be corrected for a wide field of view in a preferable manner. The second lens group, which features a great light ray height, includes a cemented lens and thus allows a chromatic aberration to be corrected in a preferable manner.

The objective is configured to satisfy conditional expression (1).

$$0.43 \leq (hg_2 - hg_1)/gt_1 \leq 0.9 \quad (1)$$

In this conditional expression, $gt_1$ indicates a thickness that the lens component of the rear group that is the closest to the object in the rear group has on an optical axis (hereinafter referred to as a first rear-group component); $hg_1$, the height of an axial marginal light ray at the lens surface of the first rear-group component that is the closest to the object in the rear group; $hg_2$, the height of the axial marginal light ray at the lens surface of the first rear-group component that is the closest to an image in the rear group. These heights of the axial marginal light ray are those achieved when the light ray is an e line.

Conditional expression (1) defines a relationship between the thickness of the first rear-group component and the difference in light ray height between light incident on the first rear-group component and light emitted from the first rear-group component. By the first rear-group component changing the light ray height greatly, a coma aberration and a field curvature can be corrected in a preferable manner. Hence, an image having a high contrast for a region up to the edge of a field of view can be obtained using an objective with a 30-fold magnification or lower that has a long focal length.

When $(hg_2-hg_1)/gt_1$ is higher than an upper limit, a light ray is largely refracted at the lens surfaces of the first rear-group component on the incidence side and the emission side, thereby generating a high-order spherical aberration and coma aberration, and hence it will be difficult to obtain a preferable image. When $(hg_2-hg_1)/gt_1$ is lower than a lower limit, it is difficult to sufficiently correct a coma aberration and a field curvature by using an objective having a long focal length. Hence, it is difficult to obtain an image having a high contrast for a region up to the edge of a field of view.

The objective may be configured to satisfy conditional expression (1-1) instead of conditional expression (1)

$$0.43 \leq (hg_2 - hg_1)/gt_1 \leq 0.6 \quad (1-1)$$

An objective configured as described above can have a high NA and correct chromatic aberrations and off-axis performances in a preferable manner. Instead of conditional expression (1), the objective may satisfy conditional expression (5), which will be described hereinafter. Particularly when the above-described dry objective with a magnification approximately within a range from a low magnification to an intermediate magnification satisfies conditional expression (5), chromatic aberrations are corrected in a preferable manner for a wide wavelength region ranging from an h line to a near-infrared region. Hence, a preferable multicolor fluorescence observation can be performed using a confocal microscope.

The following describes a desirable configuration of the objective.

The plurality of meniscus lens components included in the first lens group are each desirably a single lens. This is because incorporating a plurality of meniscus lens components each consisting of a single lens into the first lens group of the dry objective, i.e., a lens group that features a low light ray height, allows a high numerical aperture to be achieved while preventing generation of chromatic aberrations.

The second lens group desirably includes a cemented triplet lens consisting of a positive lens, a negative lens, and a positive lens, wherein an object, the positive lens, the negative lens, and the positive lens are arranged in this order. This is because chromatic aberrations can be corrected effectively by providing the second lens group, which features the greatest light ray height, with a positive-negative-positive cemented triplet lens that includes a negative lens having lens surfaces with functions to correct chromatic aberrations.

The third lens group desirably includes what is called a Double Gauss as a lens configuration. More particularly, the third lens group desirably includes a first convex lens (positive lens), a first concave lens (negative lens), a second concave lens (negative lens), and a second convex lens (positive lens), wherein the object, the first convex lens, the first concave lens, the second concave lens, and the second convex lens are arranged in this order. This is because the third lens group having a Double Gauss allows the height of a marginal light ray to be decreased at a pair of concave surfaces facing each other. This allows a Petzval sum to be corrected effectively to sufficiently decrease a field curvature.

The rear group included in the third lens group desirably includes at least two lens components. More particularly, the second concave lens and the second convex lens among the lenses that constitute the Double Gauss are adjacent to each other with air therebetween so that aberrations can be corrected independently at the lens surface of the second concave lens on the image side and the lens surface of the second convex lens on the object side. This allows the degree of correlation between a coma aberration and a chromatic aberration of magnification to be decreased. Hence, both the coma aberration and the chromatic aberration of magnification can be easily corrected in a balanced manner.

The objective desirably satisfies at least one of the following conditional expressions (2)-(6).

$$|d_1-d_2|/F \leq 0.2 \quad (2)$$

$$1.3 \leq |rg_2/d_2| \leq 2.4 \quad (3)$$

$$0.6 \leq Lf/Lb \leq 1.6 \quad (4)$$

$$57.6 \leq vd_1 \leq 87.3 \quad (5)$$

$$0.440 \leq \Delta hg \leq 0.453 \quad (6)$$

In these conditional expressions, $d_1$ indicates a thickness that a first meniscus lens component that is the closest to the object among the plurality of meniscus lens components included in the first lens group has on the optical axis; $d_2$, a thickness that a second meniscus lens component that is the second closest to the object among the plurality of meniscus lens components included in the first lens group has on the optical axis; F, the focal length of the objective for an e line; $rg_2$, a radius of curvature of a lens surface of the second meniscus lens component on an image side; Lf, a total length of the front group; Lb, a total length of the rear group; $vd_1$, an Abbe number that the lens of the objective that is the closest to the object has for a d line; $\Delta hg$, a partial dispersion ratio that the lens of the objective that is the closest to the object has for an h line, the partial dispersion ratio being defined as $\Delta hg=(n_h-n_g)/(n_F-n_C)$; $n_h$, a refractive index for the h line; $n_C$, a refractive index for a C line; $n_F$, a refractive index for an F line; $n_g$, a refractive index for a g line.

Conditional expression (2) defines a relationship between the difference in thickness between the first and second meniscus lens components and the focal length of the objective. The first meniscus lens component largely contributes to correction of coma aberrations and field curvatures. The second meniscus lens component largely contributes to correction of axial chromatic aberrations. Maintaining small the difference between the thicknesses of the first and second meniscus lenses standardized according to the focal length of the objective and, more particularly, limiting $|d_1-d_2|/F$ to an upper limit or lower allows an image having a high contrast for a region up to the edge of a field of view to be obtained while maintaining a preferable axial chromatic aberration performance.

Conditional expression (3) defines a ratio between the thickness of the second meniscus lens component and the radius of curvature of a lens surface of the second meniscus lens component on the image side. Decreasing the radius of curvature of the lens surface of the second meniscus lens component on the image side relative to the thickness of the second meniscus lens component and, more particularly, limiting $|rg_2/d_2|$ to an upper limit or lower allows the second meniscus lens component to have a sufficiently high refractive power. Hence, the height and angle of a light ray emitted from the lens surface on the image side can be limited. As a result, a dry objective with a 30-fold magnification or lower that has a long focal length can easily have a high NA. Setting $|rg_2/d_2|$ to a lower limit or higher can prevent a light ray from being excessively largely refracted at the lens surface on the image side. As a result, image deterioration that could be caused by a high-order spherical aberration can be reduced.

Conditional expression (4) defines the ratio between the total lengths of the front and rear groups within the third lens group. The third lens group is such that the front group decreases a light ray height and the rear group increases the light ray height so as to correct, among other things, a field curvature and a coma aberration. The total length of the front group is not largely different from that of the rear group, so that the high-NA dry objective with a 30-fold magnification or lower that has a long focal length can easily correct a field curvature and a coma aberration while preventing generation of other aberrations. More particularly, limiting Lf/Lb to an upper limit or lower allows a design to be made without an exit-pupil position of the objective being excessively distant from an object plane. Hence, the amount of generation of chromatic aberrations can be limited, and a chromatic aberration of magnification, among other things, can be corrected in a preferable manner. Meanwhile, limiting Lf/Lb to a lower limit or higher allows a design to be made without the exit-pupil position of the objective being excessively close to an object plane. This allows the amount of generation of field curvatures and coma aberrations within the front group to be limited so that field curvatures and coma aberrations can be corrected in a preferable manner.

Conditional expression (5) defines an Abbe number that the lens of the objective that is the closest to the object desirably has for a d line so as to maintain a field curvature and a chromatic aberration in a preferable manner. When $vd_1$ is higher than an upper limit, a high-NA dry objective with a 30-fold magnification or lower has a large Petzval sum, and it is difficult for this objective to correct a field curvature. When $vd_1$ is lower than a lower limit, a large chromatic aberration of magnification is generated by the lens that is the closest to the object. Hence, chromatic aberrations of magnification cannot be sufficiently corrected.

Conditional expression (6) defines a partial dispersion ratio that the lens of the objective that is the closest to the object desirably has for an h line so as to maintain a chromatic aberration in a preferable manner. When $\Delta hg$ is higher than an upper limit, all lenses have a low refractive index in accordance with the partial dispersion ratio. In particular, only lenses having a low refractive index have a partial dispersion ratio that is higher than the upper limit. Accordingly, when a lens having a partial dispersion ratio higher than the upper limit is used, a radius of curvature needs to be small to achieve a high numerical aperture without increasing the number of lenses. As a result, high-order aberrations are generated. When Δhg is lower than a lower limit, it is difficult to correct chromatic aberrations for the h line.

The objective may be configured to satisfy conditional expression (2-1) instead of conditional expression (2). The objective may be configured to satisfy conditional expression (3-1) instead of conditional expression (3). The objective may be configured to satisfy conditional expression (4-1) instead of conditional expression (4). The objective may be configured to satisfy conditional expression (5-1) instead of conditional expression (5). The objective may be configured to satisfy conditional expression (6-1) instead of conditional expression (6).

$$|d_1-d_2|/F \leq 0.18 \quad (2\text{-}1)$$

$$1.4 \leq |rg_2/d_2| 2.1 \quad (3\text{-}1)$$

$$0.8 \leq Lf/Lb \leq 1.4 \quad (4\text{-}1)$$

$$58.5 \leq vd_1 \leq 72.0 \quad (5\text{-}1)$$

$$0.448 \leq \Delta hg \leq 0.451 \quad (6\text{-}1)$$

The objective may use only one of the above-described conditional expressions or may use a combination of conditional expressions freely selected from these conditional expressions, and any combination can be used to achieve sufficiently advantageous effects. The upper and lower limits of the conditional expressions may each be independently changed to provide a new conditional expression which will also achieve similar advantageous effects.

The following specifically describes embodiments of the objective.

First Embodiment

FIG. 1 is a cross-sectional view of an objective 1 in accordance with the present embodiment. The objective 1 includes a first lens group G1 that has a positive refractive power, a second lens group G2 that has a positive refractive power, and a third lens group G3 that has a negative refractive power, wherein an object, the first lens group G1, the second lens group G2, and the third lens group G3 are arranged in this order. Note that the objective 1 is a dry microscope objective.

The first lens group G1 consists of a plurality of meniscus lens components. The first lens group G1 includes a lens L1 (first meniscus lens component) that is a meniscus lens having a concave surface facing the object and a lens L2 (second meniscus lens component) that is a meniscus lens having a concave surface facing the object, wherein the object, the lens L1, and the lens L2 are arranged in this order. Note that the lenses L1 and L2 are each a single lens.

The second lens group G2 includes a cemented lens CL1 and turns a pencil of diverging light from the first lens group G1 into a pencil of converging light. The second lens group G2 includes a lens L3 that is a biconvex lens and a cemented lens CL1 that is a cemented triplet lens, wherein the object, the lens L3, and the cemented lens CL1 are arranged in this order. The cemented triplet lens consists of a lens L4 that is a biconvex lens, a lens L5 that is a biconcave lens, and a lens L6 that is a biconvex lens, wherein the object, the lens L4, the lens L5, and the lens L6 are arranged in this order.

The third lens group G3 includes a front group (cemented lens CL2) and a rear group (lenses L9 and L10) that have concave surfaces adjacent to and facing each other. The third lens group G3 includes a cemented lens CL2 with a meniscus shape that has a concave surface facing an image, a lens L9 (first rear-group component) that is a meniscus lens having a concave surface facing the object, and a lens L10 that is a meniscus lens having a concave surface facing the object, wherein the object, the cemented lens CL2, the lens L9, and the lens L10 are arranged in this order. The cemented lens CL2 is a cemented doublet lens consisting of a lens L7 that is a biconvex lens and a lens L8 that is a biconcave lens. In particular, the third lens group includes a Double Gauss provided with the lens L7, which is a first convex lens, the lens L8, which is a first concave lens, the lens L9, which is a second concave lens, and the lens L10, which is a second convex lens, wherein the object, the lens L7, the lens L8, the lens L9, and the lens L10 are arranged in this order.

Various data on the objective 1 are indicated below. Note that β indicates a magnification achieved when the objective 1 is combined with a tube lens having a focal length of 180 mm, $NA_{ob}$ indicates the numerical aperture of the objective 1 on the object side, and $f_{G1}$, $f_{G2}$, and $f_{G3}$ respectively indicate the focal lengths of the first lens group G1, the second lens group G2, and the third lens group G3. Note that an e line is a reference wavelength.

β=−20, $NA_{ob}$=0.8, $f_{G1}$=14.714 mm, $f_{G2}$=24.120 mm, $f_{G3}$=−76.418 mm, $gt_1$=2.4854 mm, $hg_1$=4.9121 mm, $hg_2$=6.3050 mm, $d_1$=5.1142 mm, $d_2$=4.0708 mm, F=8.9985 mm, $rg_2$=−7.7412 mm, Lf=6.8638 mm, Lb=5.9202 mm, $vd_1$=65.44, Δhg=0.450512

The following are lens data of the objective 1. INF in the lens data indicates infinity (∞).

| Objective 1 | | | | |
|---|---|---|---|---|
| s | r | d | ne | vd |
| 0 | INF | 0.1700 | 1.52626 | 54.41 |
| 1 | INF | 1.1700 | | |
| 2 | −3.1485 | 5.1142 | 1.60520 | 65.44 |
| 3 | −4.9459 | 0.3439 | | |
| 4 | −21.3731 | 4.0708 | 1.43986 | 94.66 |
| 5 | −7.7412 | 0.3283 | | |
| 6 | 23.7065 | 3.8574 | 1.43985 | 94.93 |
| 7 | −28.0810 | 4.6645 | | |
| 8 | 38.8862 | 4.9835 | 1.43985 | 94.93 |
| 9 | −10.6104 | 1.5000 | 1.64132 | 42.41 |
| 10 | 20.0426 | 5.1722 | 1.43985 | 94.93 |
| 11 | −13.3781 | 0.2448 | | |
| 12 | 9.8500 | 5.3638 | 1.43985 | 94.93 |
| 13 | −22.0444 | 1.5000 | 1.64132 | 42.41 |
| 14 | 7.7482 | 5.0000 | | |
| 15 | −6.1396 | 2.4854 | 1.59143 | 61.14 |
| 16 | −11.5747 | 0.1886 | | |
| 17 | −19.5016 | 3.2462 | 1.74341 | 32.26 |
| 18 | −10.7423 | | | | s indicates a surface number; r, a radius of curvature (mm); d, a surface interval (mm); ne, a refractive index for an e line; vd, an Abbe number for a d line. These marks are also applicable to the embodiments described hereinafter. Surface numbers s0 and s1 respectively indicate a surface of a cover glass CG on an object side and a surface of the cover glass CG on an image side. Surface numbers s2 and s18 respectively indicate a lens surface of the objective 1 that is the closest to an object and a lens surface of the objective 1 that is the closest to an image. For example, surface interval d1 indicates a distance on an optical axis from the surface indicated by surface number s1 to the surface indicated by surface number s2.

As indicated in the following, the objective 1 satisfies conditional expressions (1)-(4). The objective 1 also satisfies conditional expressions (5) and (6).

$(hg_2-hg_1)/gt_1=0.560$ (1)

$|d_1-d_2|/F=0.116$ (2)

$|rg_2/d_2|=1.902$ (3)

$Lf/Lb=0.863$ (4)

Figure 2:
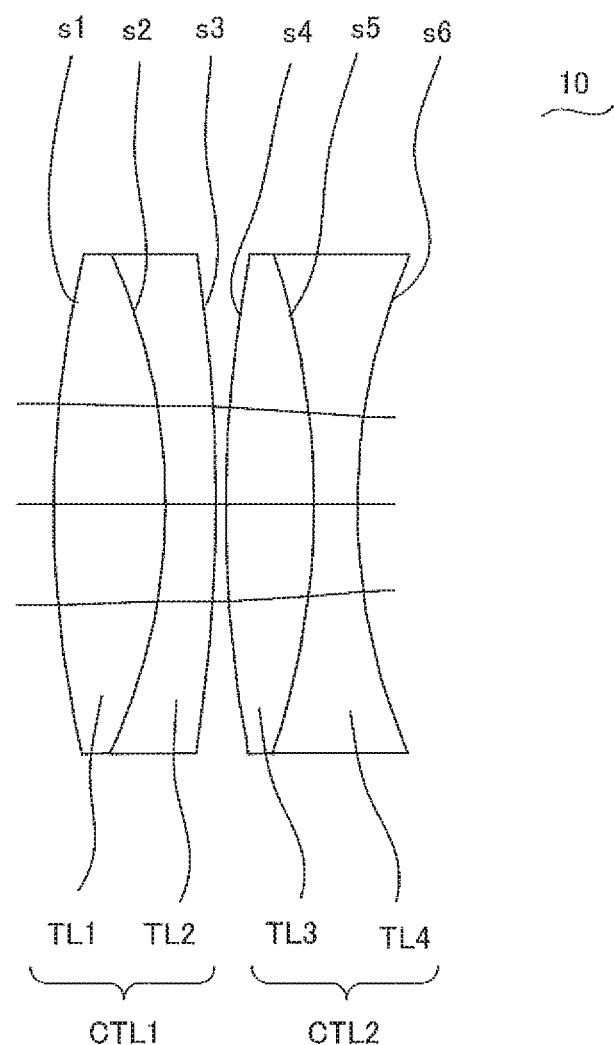
FIG. 2 is a cross-sectional view of a tube lens 10.

FIG. 2 is a cross-sectional view of a tube lens 10 to be used in combination with the objective 1. The tube lens 10 is a microscope tube lens used in combination with an infinity-corrected objective so as to form an enlarged image of an object. The tube lens 10 includes a cemented lens CTL1 and a cemented lens CTL2, wherein the object, the cemented lens CTL1, and the cemented lens CTL2 are arranged in this order. The cemented lens CTL1 consists of a lens TL1 that is a biconvex lens and a lens TL2 that is a meniscus lens having a concave surface facing the object. The cemented lens CTL2 consists of a lens TL3 that is a biconvex lens and lens TL4 that is a biconcave lens. The tube lens 10 is positioned in a manner such that the distance on an optical axis from lens surface s18, i.e., the lens surface of the objective 1 that is the closest to the image, to lens surface s1, i.e., the lens surface of the tube lens 10 that is the closest to the object, is 114.665 mm. The tube lens 10 has a focal length of 179.99 mm.

The following are lens data of the tube lens 10.

Tube lens 10

| s | r | d | ne | vd |
|---|---|---|---|---|
| 1 | 68.7541 | 7.7321 | 1.48915 | 70.23 |
| 2 | −37.5679 | 3.4742 | 1.81078 | 40.92 |
| 3 | −102.8477 | 0.6973 | | |
| 4 | 84.3099 | 6.0238 | 1.83932 | 37.16 |
| 5 | −50.7100 | 3.0298 | 1.64824 | 40.82 |
| 6 | 40.6619 | | | |

Figure 3:
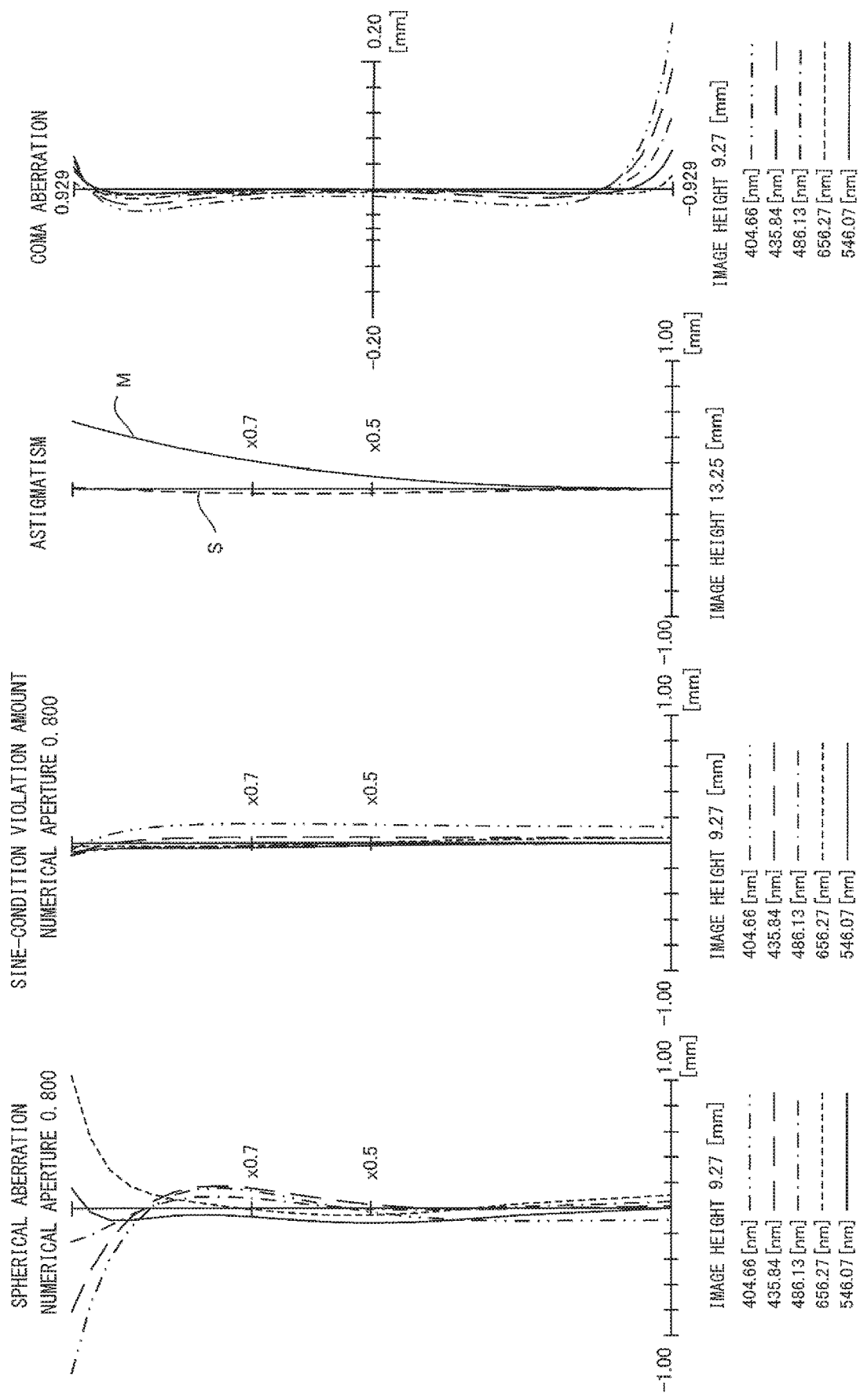

FIGS. 3A-3D are each an aberration diagram for an optical system that includes the objective 1 and the tube lens 10. FIGS. 3A-3D indicate aberrations that occur on an image plane formed by the objective 1 and the tube lens 10. FIG. 3A is a spherical aberration diagram. FIG. 3B illustrates a sine-condition violation amount. FIG. 3C is an astigmatism diagram. FIG. 3D is a coma aberration diagram for an image height ratio of 0.7. "M" in the figures indicates a meridional component, and "S" indicates a sagittal component. In the present embodiment, as depicted in FIGS. 3A-3D, aberrations are corrected for a wide field of view in a preferable manner.

Second Embodiment

Figure 4:
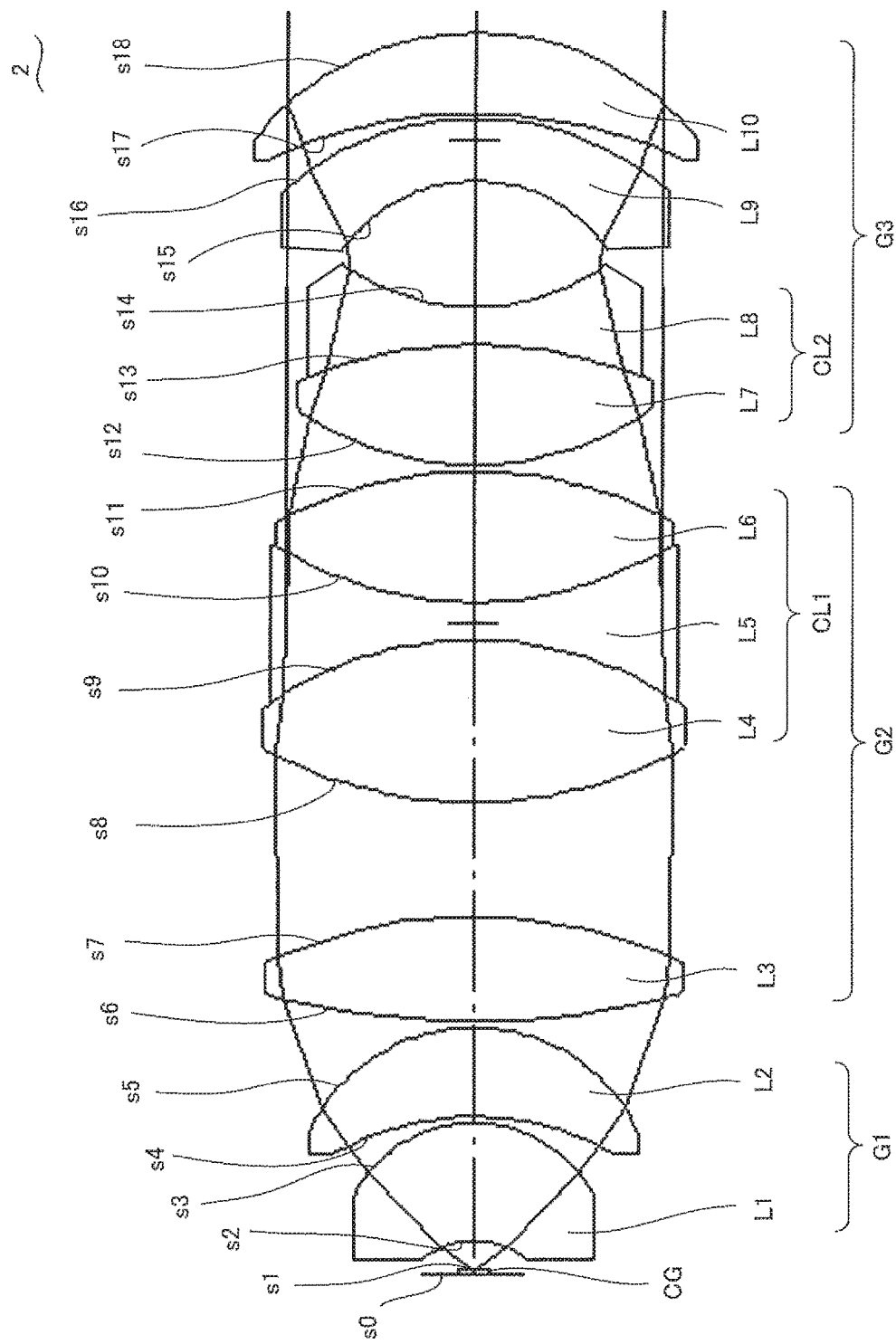
FIG. 4 is a cross-sectional view of an objective 2 in accordance with a second embodiment of the invention.

FIG. 4 is a cross-sectional view of an objective 2 in accordance with the present embodiment. The objective 2 includes a first lens group G1 that has a positive refractive power, a second lens group G2 that has a positive refractive power, and a third lens group G3 that has a negative refractive power, wherein an object, the first lens group G1, the second lens group G2, and the third lens group G3 are arranged in this order. Note that the objective 2 is a dry microscope objective.

The first lens group G1 consists of a plurality of meniscus lens components. The first lens group G1 includes a lens L1 (first meniscus lens component) that is a meniscus lens having a concave surface facing the object and a lens L2 (second meniscus lens component) that is a meniscus lens having a concave surface facing the object, wherein the object, the lens L1, and the lens L2 are arranged in this order. Note that the lenses L1 and L2 are each a single lens.

The second lens group G2 includes a cemented lens CL1 and turns a pencil of diverging light from the first lens group G1 into a pencil of converging light. The second lens group G2 includes a lens L3 that is a biconvex lens and a cemented lens CL1 that is a cemented triplet lens, wherein the object, the lens L3, and the cemented lens CL1 are arranged in this order. The cemented triplet lens consists of a lens L4 that is a biconvex lens, a lens L5 that is a biconcave lens, and a lens L6 that is a biconvex lens, wherein the object, the lens L4, the lens L5, and the lens L6 are arranged in this order.

The third lens group G3 includes a front group (cemented lens CL2) and a rear group (lenses L9 and L10) that have concave surfaces adjacent to and facing each other. The third lens group G3 includes a cemented lens CL2 with a meniscus shape that has a concave surface facing an image, a lens L9 (first rear-group component) that is a meniscus lens having a concave surface facing the object, and a lens L10 that is a meniscus lens having a concave surface facing the object, wherein the object, the cemented lens CL2, the lens L9, and the lens L10 are arranged in this order. The cemented lens CL2 is a cemented doublet lens consisting of a lens L7 that is a biconvex lens and a lens L8 that is a biconcave lens. In particular, the third lens group includes a Double Gauss provided with the lens L7, which is a first convex lens, the lens L8, which is a first concave lens, the lens L9, which is a second concave lens, and the lens L10, which is a second convex lens, wherein the object, the lens L7, the lens L8, the lens L9, and the lens L10 are arranged in this order.

The following are various data on the objective 2. $\beta=-20$, $NA_{ob}=0.8$, $f_{G1}=21.927$ mm, $f_{G2}=18.790$ mm, $f_{G3}=-58.470$ mm, $gt_1=2.4852$ mm, $hg_1=4.8967$ mm, $hg_2=6.2818$ mm, $d_1=4.6762$ mm, $d_2=3.5581$ mm, $F=8.9970$ mm, $rg_2=-6.7957$ mm, $Lf=6.2937$ mm, $Lb=5.8969$ mm, $vd_1=71.3$, $\Delta hg=0.449875$ The following are lens data of the objective 2.

Objective 2

| s | r | d | ne | vd |
|---|---|---|---|---|
| 0 | INF | 0.1700 | 1.52626 | 54.41 |
| 1 | INF | 1.1700 | | |
| 2 | −3.1129 | 4.6762 | 1.57098 | 71.30 |
| 3 | −5.0543 | 0.2483 | | |
| 4 | −10.4984 | 3.5581 | 1.49846 | 81.54 |
| 5 | −6.7957 | 0.2485 | | |
| 6 | 30.0054 | 4.1552 | 1.43985 | 94.93 |
| 7 | −18.3726 | 4.5623 | | |
| 8 | 16.1689 | 6.4511 | 1.43985 | 94.93 |
| 9 | −13.3141 | 1.5000 | 1.64132 | 42.41 |
| 10 | 13.9146 | 5.1873 | 1.43985 | 94.93 |
| 11 | −15.4042 | 0.2440 | | |
| 12 | 11.4105 | 4.7937 | 1.43985 | 94.93 |
| 13 | −16.2900 | 1.5000 | 1.64132 | 42.41 |
| 14 | 8.3092 | 5.0000 | | |
| 15 | −6.0703 | 2.4852 | 1.59143 | 61.14 |
| 16 | −10.8089 | 0.1893 | | |
| 17 | −18.2915 | 3.2224 | 1.74341 | 32.26 |
| 18 | −10.6176 | | | |

Surface numbers s2 and s18 respectively indicate a lens surface of the objective 2 that is the closest to the object and a lens surface of the objective 2 that is the closest to the image. The tube lens 10 is positioned in a manner such that the distance on an optical axis from lens surface s18, i.e., the lens surface of the objective 2 that is the closest to the image, to lens surface s1, i.e., the lens surface of the tube lens 10 that is the closest to the object, is 114.655 mm.

As indicated in the following, the objective 2 satisfies conditional expressions (1)-(4). The objective 2 also satisfies conditional expressions (5) and (6).

$$(hg_2-hg_1)/gt_1=0.557 \quad (1)$$

$$|d_1-d_2|/F=0.124 \quad (2)$$

$$|rg_2/d_2|=1.910 \quad (3)$$

$$Lf/Lb=0.937 \quad (4)$$

Figure 5:
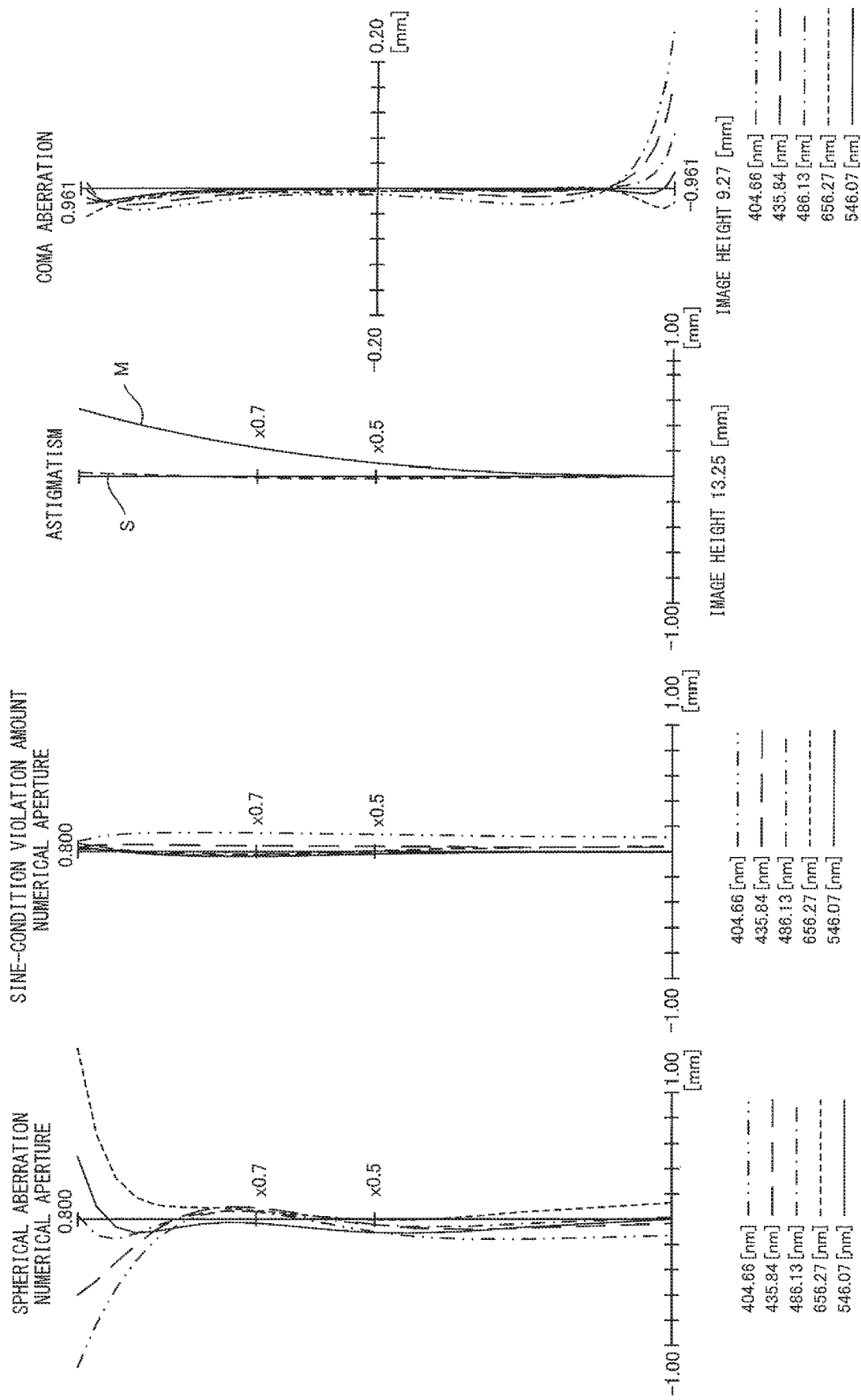

FIGS. 5A-5D are each an aberration diagram for an optical system that includes the objective 2 and the tube lens 10. FIGS. 5A-5D indicate aberrations that occur on an image plane formed by the objective 2 and the tube lens 10. FIG. 5A is a spherical aberration diagram. FIG. 5B illustrates a sine-condition violation amount. FIG. 5C is an astigmatism diagram. FIG. 5D is a coma aberration diagram for an image height ratio of 0.7. In the present embodiment, as depicted in FIGS. 5A-5D, aberrations are corrected for a wide field of view in a preferable manner.

Third Embodiment

Figure 6:
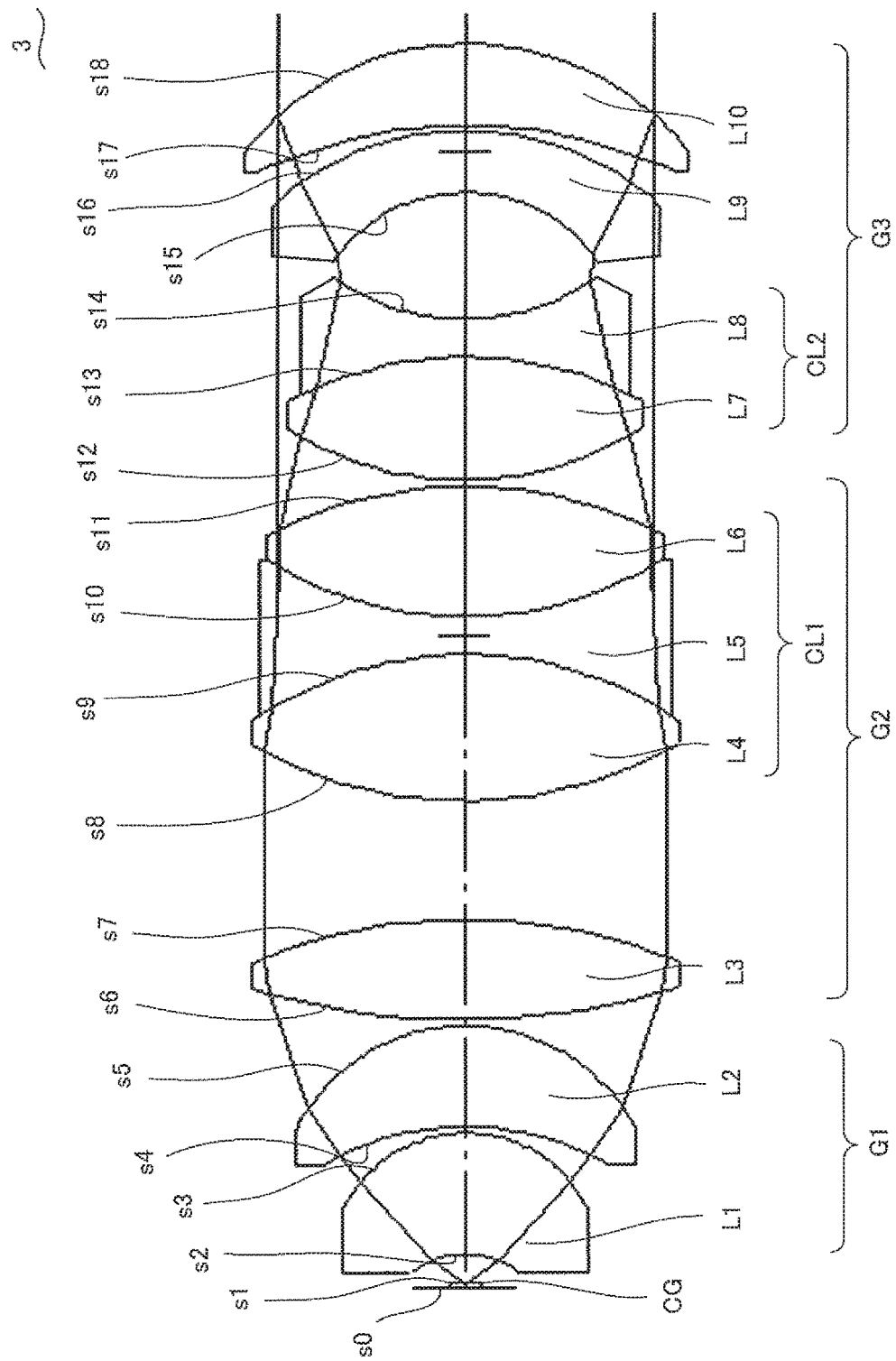
FIG. 6 is a cross-sectional view of an objective 3 in accordance with a third embodiment of the invention.

FIG. 6 is a cross-sectional view of an objective 3 in accordance with the present embodiment. The objective 3 includes a first lens group G1 that has a positive refractive power, a second lens group G2 that has a positive refractive power, and a third lens group G3 that has a negative refractive power, wherein an object, the first lens group G1, the second lens group G2, and the third lens group G3 are arranged in this order. Note that the objective 3 is a dry microscope objective.

The first lens group G1 consists of a plurality of meniscus lens components. The first lens group G1 includes a lens L1 (first meniscus lens component) that is a meniscus lens having a concave surface facing the object and a lens L2 (second meniscus lens component) that is a meniscus lens having a concave surface facing the object, wherein the object, the lens L1, and the lens L2 are arranged in this order. Note that the lenses L1 and L2 are each a single lens.

The second lens group G2 includes a cemented lens CL1 and turns a pencil of diverging light from the first lens group G1 into a pencil of converging light. The second lens group G2 includes a lens L3 that is a biconvex lens and a cemented lens CL1 that is a cemented triplet lens, wherein the object, the lens L3, and the cemented lens CL1 are arranged in this order. The cemented triplet lens consists of a lens L4 that is a biconvex lens, a lens L5 that is a biconcave lens, and a lens L6 that is a biconvex lens, wherein the object, the lens L4, the lens L5, and the lens L6 are arranged in this order.

The third lens group G3 includes a front group (cemented lens CL2) and a rear group (lenses L9 and L10) that have concave surfaces facing each other. The third lens group G3 includes a cemented lens CL2 with a meniscus shape that has a concave surface adjacent to and facing an image, a lens L9 (first rear-group component) that is a meniscus lens having a concave surface facing the object, and a lens L10 that is a meniscus lens having a concave surface facing the object, wherein the object, the cemented lens CL2, the lens L9, and the lens L10 are arranged in this order. The cemented lens CL2 is a cemented doublet lens consisting of a lens L7 that is a biconvex lens and a lens L8 that is a biconcave lens. In particular, the third lens group includes a Double Gauss provided with the lens L7, which is a first convex lens, the lens L8, which is a first concave lens, the lens L9, which is a second concave lens, and the lens L10, which is a second convex lens, wherein the object, the lens L7, the lens L8, the lens L9, and the lens L10 are arranged in this order.

The following are various data on the objective 3. $\beta=-20$, $NA_{ob}=0.8$, $f_{G1}=21.012$ mm, $f_{G2}=18.939$ mm, $f_{G3}=-53.292$ mm, $gt_1=2.4864$ mm, $hg_1=4.8879$ mm, $hg_2=6.2684$ mm, $d_1=4.8148$ mm, $d_2=3.9975$ mm, $F=8.9970$ mm, $rg_2=-7.1646$ mm, $Lf=6.4015$ mm, $Lb=5.9044$ mm, $vd_1=68.3$, $\Delta hg=0.452134$ The following are lens data of the objective 3.

| Objective 3 | | | | |
|---|---|---|---|---|
| s | r | d | ne | vd |
| 0 | INF | 0.1700 | 1.52626 | 54.41 |
| 1 | INF | 1.1700 | | |
| 2 | −3.2576 | 4.8148 | 1.59446 | 68.30 |
| 3 | −5.1068 | 0.2496 | | |
| 4 | −10.7156 | 3.9975 | 1.49846 | 81.54 |
| 5 | −7.1646 | 0.2502 | | |
| 6 | 26.9829 | 3.9849 | 1.43985 | 94.93 |
| 7 | −20.4865 | 4.7103 | | |
| 8 | 15.8841 | 5.8149 | 1.43985 | 94.93 |
| 9 | −13.8407 | 1.5000 | 1.64132 | 42.41 |
| 10 | 13.8407 | 5.1488 | 1.43985 | 94.93 |
| 11 | −15.8537 | 0.2446 | | |
| 12 | 12.2969 | 4.9015 | 1.43985 | 94.93 |
| 13 | −13.7829 | 1.5000 | 1.64132 | 42.41 |
| 14 | 8.5603 | 5.0000 | | |
| 15 | −6.0580 | 2.4864 | 1.59143 | 61.14 |
| 16 | −10.6080 | 0.1901 | | |
| 17 | −18.1664 | 3.2279 | 1.74341 | 32.26 |
| 18 | −10.6108 | | | |

Surface numbers s2 and s18 respectively indicate a lens surface of the objective 3 that is the closest to the object and a lens surface of the objective 3 that is the closest to the image. The tube lens 10 is positioned in a manner such that the distance on an optical axis from lens surface s18, i.e., the lens surface of the objective 3 that is the closest to the image, to lens surface s1, i.e., the lens surface of the tube lens 10 that is the closest to the object, is 114.698 mm.

As indicated in the following, the objective 3 satisfies conditional expressions (1)-(4). The objective 3 also satisfies conditional expressions (5) and (6).

$$(hg_2-hg_1)/gt_1=0.555 \quad (1)$$

$$|d_1-d_2|/F=0.091 \quad (2)$$

$$|rg_2/d_2|=1.792 \quad (3)$$

$$Lf/Lb=0.922 \quad (4)$$

Figures 7A, 7B, 7C, 7D:
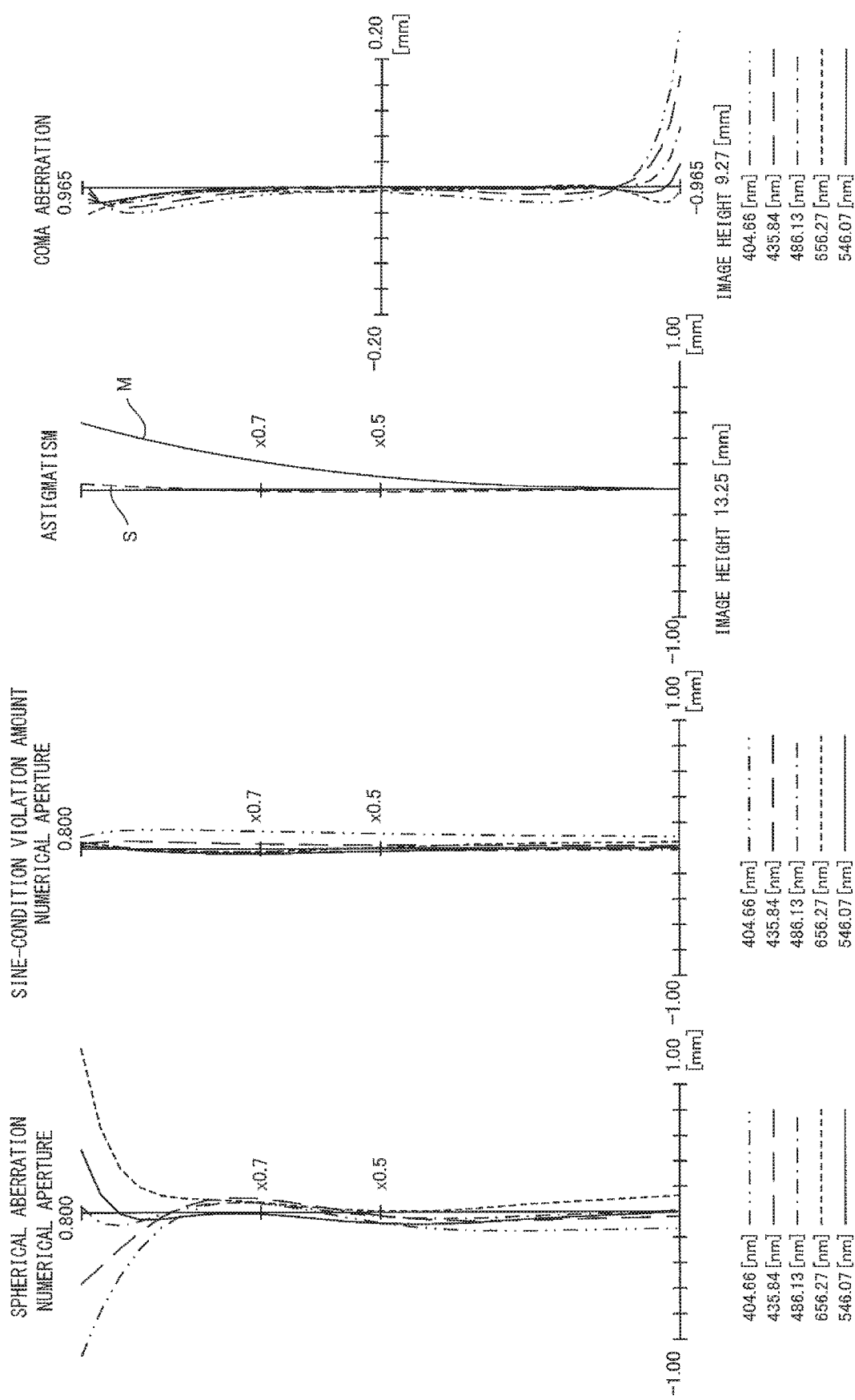

FIGS. 7A-7D are each an aberration diagram for an optical system that includes the objective 3 and the tube lens 10. FIGS. 7A-7D indicate aberrations that occur on an image plane formed by the objective 3 and the tube lens 10. FIG. 7A is a spherical aberration diagram. FIG. 7B illustrates a sine-condition violation amount. FIG. 7C is an astigmatism diagram. FIG. 7D is a coma aberration diagram for an image height ratio of 0.7. In the present embodiment, as depicted in FIGS. 7A-7D, aberrations are corrected for a wide field of view in a preferable manner.

Fourth Embodiment

Figure 8:
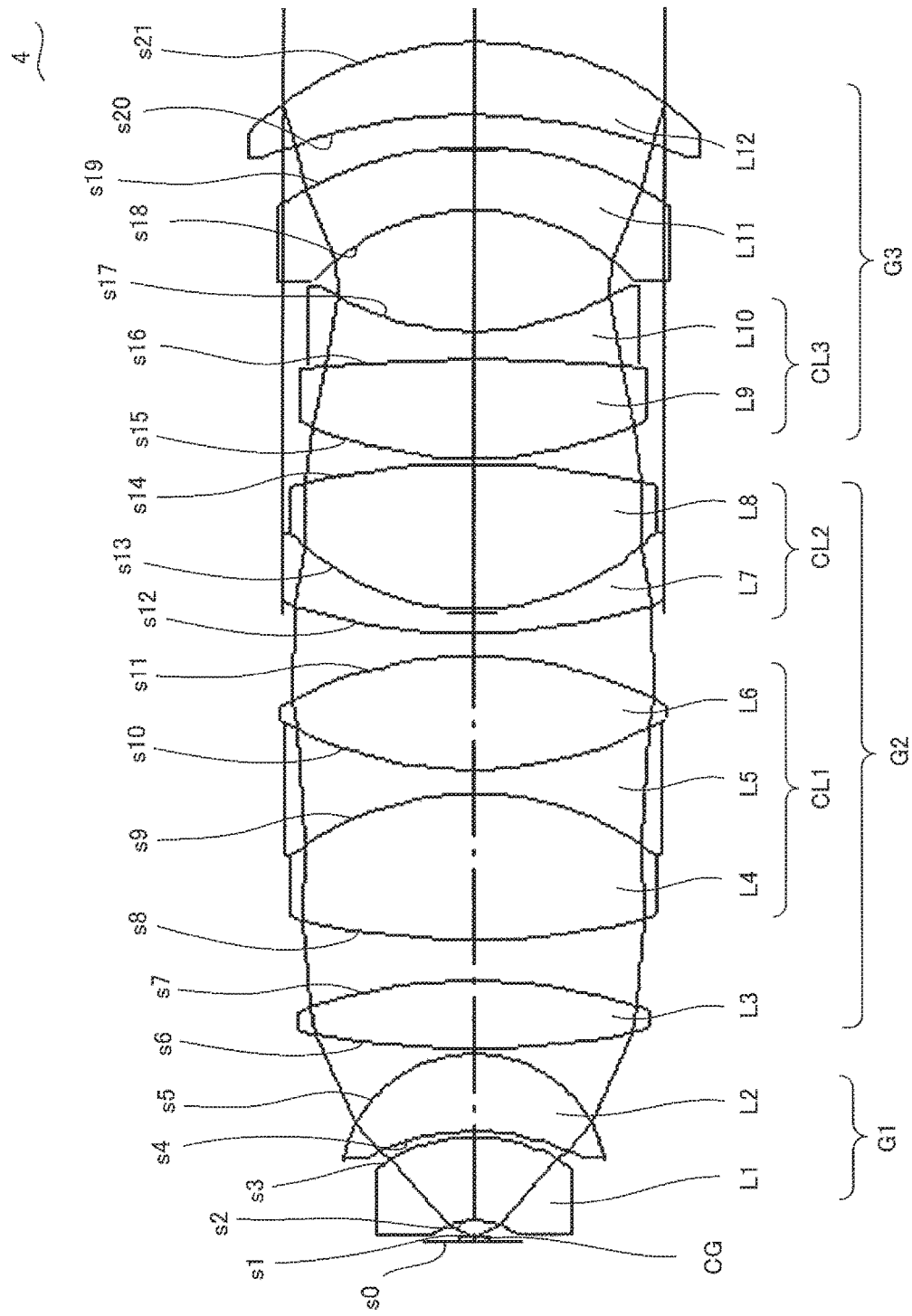
FIG. 8 is a cross-sectional view of an objective 4 in accordance with a fourth embodiment of the invention.

FIG. 8 is a cross-sectional view of an objective 4 in accordance with the present embodiment. The objective 4 includes a first lens group G1 that has a positive refractive power, a second lens group G2 that has a positive refractive power, and a third lens group G3 that has a negative refractive power, wherein an object, the first lens group G1, the second lens group G2, and the third lens group G3 are arranged in this order. Note that the objective 4 is a dry microscope objective.

The first lens group G1 consists of a plurality of meniscus lens components. The first lens group G1 includes a lens L1 (first meniscus lens component) that is a meniscus lens having a concave surface facing the object and a lens L2 (second meniscus lens component) that is a meniscus lens having a concave surface facing the object, wherein the object, the lens L1, and the lens L2 are arranged in this order. Note that the lenses L1 and L2 are each a single lens.

The second lens group G2 includes a cemented lens CL1 and a cemented lens CL2 and turns a pencil of diverging light from the first lens group G1 into a pencil of converging light. The second lens group G2 includes a lens L3 that is a biconvex lens, a cemented lens CL1 that is a cemented triplet lens, and a cemented lens CL2 that is a cemented doublet lens, wherein the object, the lens L3, the cemented lens CL1, and the cemented lens CL2 are arranged in this order. The cemented triplet lens consists of a lens L4 that is a biconvex lens, a lens L5 that is a biconcave lens, and a lens L6 that is a biconvex lens, wherein the object, the lens L4, the lens L5, and the lens L6 are arranged in this order. The cemented doublet lens consists of a lens L7 that is a meniscus lens having a concave surface facing an image and a lens L8 that is a biconvex lens, wherein the object, the lens L7, and the lens L8 are arranged in this order.

The third lens group G3 includes a front group (cemented lens CL3) and a rear group (lenses L11 and L12) that have concave surfaces adjacent to and facing each other. The third lens group G3 includes a cemented lens CL3, a lens L11 (first rear-group component) that is a meniscus lens having a concave surface facing the object, and a lens L12 that is a meniscus lens having a concave surface facing the object, wherein the object, the cemented lens CL3, the lens L11, and the lens L12 are arranged in this order. The cemented lens CL3 is a cemented doublet lens consisting of a lens L9 that is a biconvex lens and a lens L10 that is a biconcave lens. In particular, the third lens group includes a Double Gauss provided with the lens L9, which is a first convex lens, the lens L10, which is a first concave lens, the lens L11, which is a second concave lens, and the lens L12, which is a second convex lens, wherein the object, the lens L9, the lens L10, the lens L11, and the lens L12 are arranged in this order.

The following are various data on the objective 4. β=−20, $NA_{ob}$=0.85, $f_m$=33.969 mm, $f_{G2}$=16.619 mm, $f_{G3}$=−75.641 mm, $gt_1$=2.6098 mm, $hg_1$=5.5339 mm, $hg_2$=6.6569 mm, $d_1$=3.4603 mm, $d_2$=3.1935 mm, F=8.9988 mm, $rg_2$=−5.2556 mm, Lf=5.2509 mm, Lb=6.9328 mm, $vd_1$=59.0, Δhg=0.450764

The following are lens data of the objective 4.

| Objective 4 | | | | |
|---|---|---|---|---|
| s | r | d | ne | vd |
| 0 | INF | 0.1700 | 1.52626 | 54.41 |
| 1 | INF | 0.6993 | | |
| 2 | −2.8204 | 3.4603 | 1.69841 | 59.00 |
| 3 | −6.4593 | 0.2458 | | |
| 4 | −9.0625 | 3.1935 | 1.59446 | 68.30 |
| 5 | −5.2556 | 0.2469 | | |
| 6 | 33.4843 | 2.7596 | 1.59446 | 68.30 |
| 7 | −20.2765 | 1.7119 | | |
| 8 | 27.1383 | 6.0293 | 1.43985 | 94.93 |
| 9 | −11.6092 | 1.0000 | 1.64132 | 42.41 |
| 10 | 15.2557 | 4.7007 | 1.43985 | 94.93 |
| 11 | −15.2057 | 0.9421 | | |
| 12 | 22.7822 | 1.0000 | 1.69841 | 59.00 |
| 13 | 9.9300 | 5.9691 | 1.43985 | 94.93 |
| 14 | −29.7436 | 0.2492 | | |
| 15 | 16.3026 | 4.1074 | 1.43985 | 94.93 |
| 16 | −67.6000 | 1.1435 | 1.64132 | 42.41 |
| 17 | 10.9614 | 5.0000 | | |
| 18 | −8.3089 | 2.6098 | 1.69841 | 59.00 |
| 19 | −13.4504 | 1.3242 | | |
| 20 | −21.0854 | 2.9988 | 1.74341 | 32.26 |
| 21 | −12.7409 | | | |

Surface numbers s2 and s21 respectively indicate a lens surface of the objective 4 that is the closest to the object and a lens surface of the objective 4 that is the closest to the image. The tube lens 10 is positioned in a manner such that the distance on an optical axis from lens surface s21, i.e., the lens surface of the objective 4 that is the closest to the image, to lens surface s1, i.e., the lens surface of the tube lens 10 that is the closest to the object, is 114.499 mm.

As indicated in the following, the objective 4 satisfies conditional expressions (1)-(4). The objective 4 also satisfies conditional expressions (5) and (6).

$$(hg_2-hg_1)/gt_1=0.430 \tag{1}$$

$$|d_1-d_2|/F=0.030 \tag{2}$$

$$|rg_2/d_2|=1.646 \tag{3}$$

$$Lf/Lb=1.320 \tag{4}$$

Figure 9:
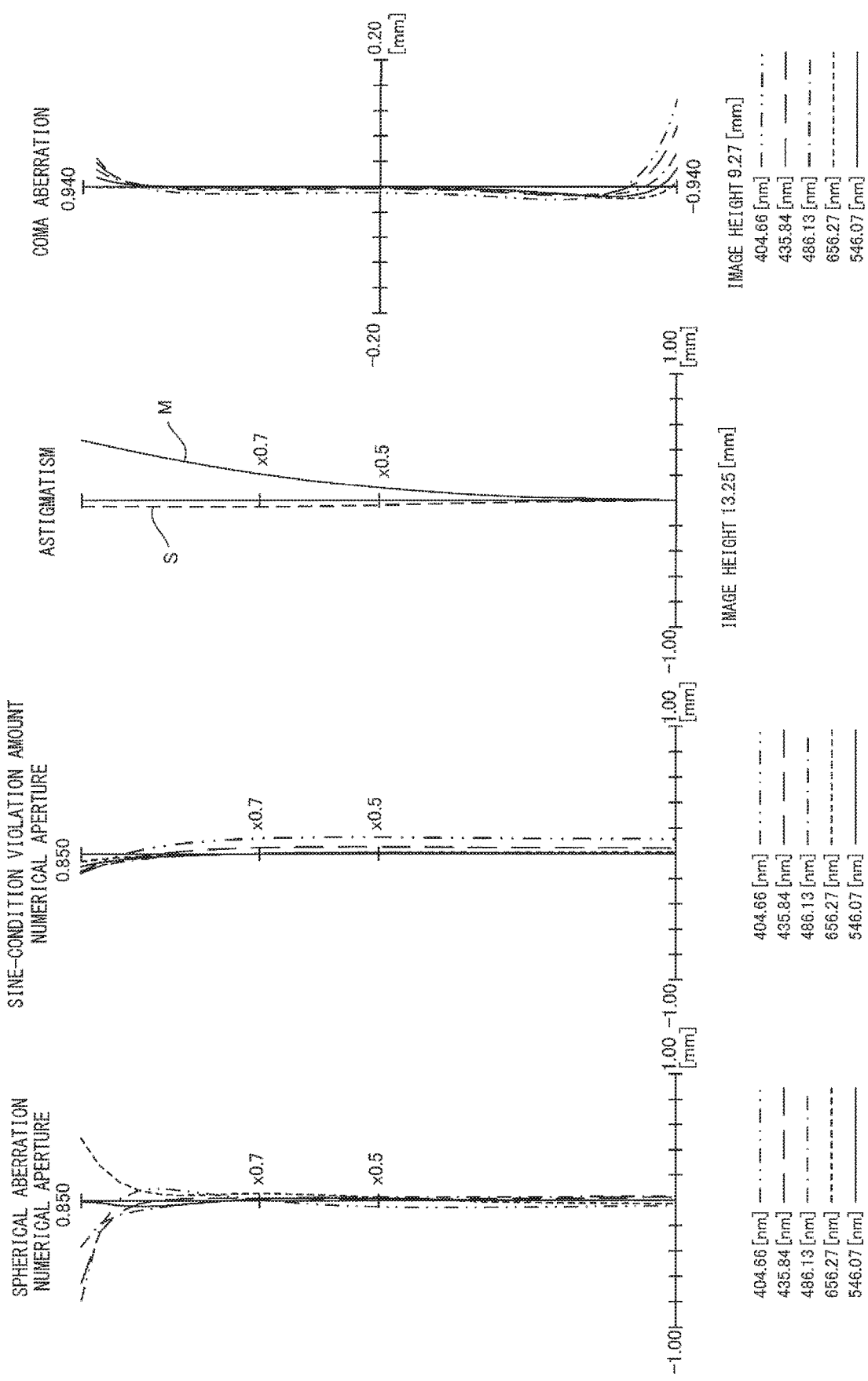

FIGS. 9A-9D are each an aberration diagram for an optical system that includes the objective 4 and the tube lens 10. FIGS. 9A-9D indicate aberrations that occur on an image plane formed by the objective 4 and the tube lens 10. FIG. 9A is a spherical aberration diagram. FIG. 9B illustrates a sine-condition violation amount. FIG. 9C is an astigmatism diagram. FIG. 9D is a coma aberration diagram for an image height ratio of 0.7. In the present embodiment, as depicted in FIGS. 9A-9D, aberrations are corrected for a wide field of view in a preferable manner.

Fifth Embodiment

Figure 10:
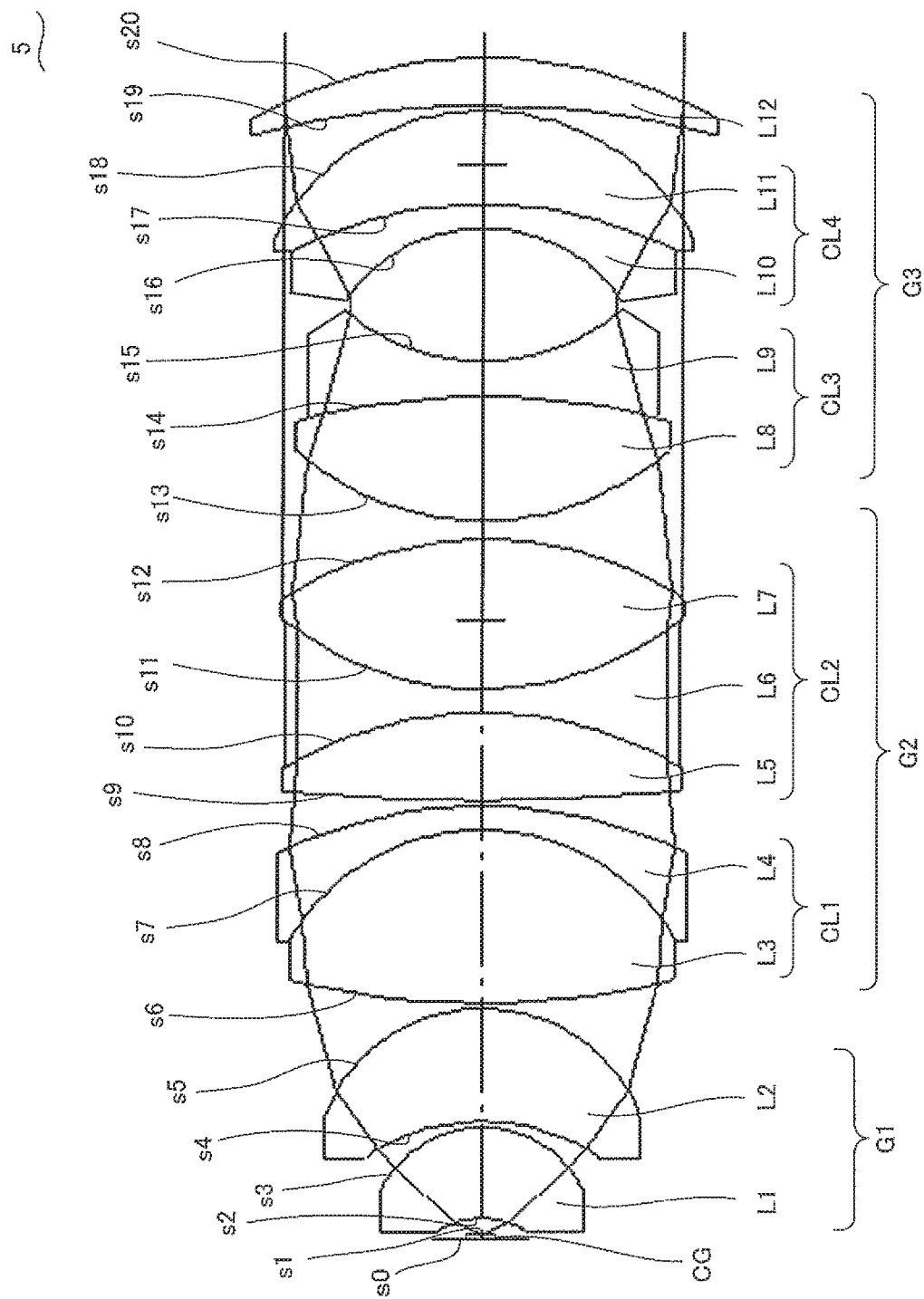
FIG. 10 is a cross-sectional view of an objective 5 in accordance with a fifth embodiment of the invention.

FIG. 10 is a cross-sectional view of an objective 5 in accordance with the present embodiment. The objective 5 includes a first lens group G1 that has a positive refractive power, a second lens group G2 that has a positive refractive power, and a third lens group G3 that has a negative refractive power, wherein an object, the first lens group G1, the second lens group G2, and the third lens group G3 are arranged in this order. Note that the objective 5 is a dry microscope objective.

The first lens group G1 consists of a plurality of meniscus lens components. The first lens group G1 includes a lens L1 (first meniscus lens component) that is a meniscus lens having a concave surface facing the object and a lens L2 (second meniscus lens component) that is a meniscus lens having a concave surface facing the object, wherein the object, the lens L1, and the lens L2 are arranged in this order. Note that the lenses L1 and L2 are each a single lens.

The second lens group G2 includes a cemented lens CL1 and a cemented lens CL2 and turns a pencil of diverging light from the first lens group G1 into a pencil of converging light. The second lens group G2 includes a cemented lens CL1 that is a cemented doublet lens and a cemented lens CL2 that is a cemented triplet lens, wherein the object, the cemented lens CL1, and the cemented lens CL2 are arranged in this order. The cemented doublet lens consists of a lens L3 that is a biconvex lens and a lens L4 that is a meniscus lens having a concave surface facing the object, wherein the object, the lens L3, and the lens L4 are arranged in this order. The cemented triplet lens consists of a lens L5 that is a biconvex lens, a lens L6 that is a biconcave lens, and a lens L7 that is a biconvex lens, wherein the object, the lens L5, the lens L6, and the lens L7 are arranged in this order.

The third lens group G3 includes a front group (cemented lens CL3) and a rear group (cemented lens CL4 and lens L12) that have concave surfaces adjacent to and facing each other. The third lens group G3 includes a cemented lens CL3, a cemented lens CL4 (first rear-group component), and a lens L12 that is a meniscus lens having a concave surface facing the object, wherein the object, the cemented lens CL3, the cemented lens CL4, and the lens L12 are arranged in this order. The cemented lens CL3, which is a cemented doublet lens provided with a lens L8 that is a biconvex lens and a lens L9 that is a biconcave lens, has an overall shape of a meniscus with a concave surface facing the image. The cemented lens CL4, which is a cemented doublet lens provided with a lens L10 that is a meniscus lens having a concave surface facing the object and a lens L11 that is a meniscus lens having a concave surface facing the object, has an overall shape of a meniscus with a concave surface facing the object. In particular, the third lens group includes a Double Gauss provided with the lens L8, which is a first convex lens, the lens L9, which is a first concave lens, the lens L10, which is a second concave lens, and the lens L11, which is a second convex lens, wherein the object, the lens L8, the lens L9, the lens L10, and the lens L11 are arranged in this order.

The following are various data on the objective 5. $\beta=-20$, $NA_{ob}=0.9$, $f_{G1}=13.205$ mm, $f_{G2}=23.094$ mm, $f_{G3}=-119.1265$ mm, $gt_1=4.9471$ mm, $hg_1=5.4368$ mm, $hg_2=7.5835$ mm, $d_1=3.8360$ mm, $d_2=4.7280$ mm, $F=8.9986$ mm, $rg_2=-6.7319$ mm, $Lf=6.6979$ mm, $Lb=7.1638$ mm, $vd_1=59.0$, $\Delta hg=0.450764$ The following are lens data of the objective 5.

| Objective 5 | | | | |
| --- | --- | --- | --- | --- |
| s | r | d | ne | vd |
| 0 | INF | 0.1700 | 1.52626 | 54.41 |
| 1 | INF | 0.7000 | | |
| 2 | −3.2439 | 3.8360 | 1.69841 | 59.00 |
| 3 | −4.4730 | 0.2500 | | |
| 4 | −8.1816 | 4.7280 | 1.69841 | 59.00 |
| 5 | −6.7317 | 0.2500 | | |
| 6 | 33.2321 | 7.2559 | 1.57098 | 71.30 |
| 7 | −8.9286 | 1.0000 | 1.64132 | 42.41 |
| 8 | −18.4167 | 0.2500 | | |
| 9 | 95.1016 | 3.6647 | 1.43985 | 94.93 |
| 10 | −15.1492 | 1.0000 | 1.64132 | 42.41 |
| 11 | 12.4281 | 6.2785 | 1.43985 | 94.93 |
| 12 | −14.4610 | 0.7890 | | |
| 13 | 11.2126 | 5.2164 | 1.49846 | 81.54 |
| 14 | −27.8000 | 1.4815 | 1.64132 | 42.41 |
| 15 | 8.4946 | 5.5547 | | |
| 16 | −6.6741 | 0.9979 | 1.77621 | 49.60 |
| 17 | −16.5740 | 3.9492 | 1.74341 | 32.26 |

-continued

| Objective 5 | | | | |
| --- | --- | --- | --- | --- |
| s | r | d | ne | vd |
| 18 | −9.4344 | 0.2012 | | |
| 19 | −38.5353 | 2.0155 | 1.43985 | 94.93 |
| 20 | −18.6541 | | | |

Surface numbers s2 and s20 respectively indicate a lens surface of the objective 5 that is the closest to the object and a lens surface of the objective 5 that is the closest to the image. The tube lens 10 is positioned in a manner such that the distance on an optical axis from lens surface s20, i.e., the lens surface of the objective 5 that is the closest to the image, to lens surface s1, i.e., the lens surface of the tube lens 10 that is the closest to the object, is 119.472 mm.

As indicated in the following, the objective 5 satisfies conditional expressions (1)-(4). The objective 5 also satisfies conditional expressions (5) and (6).

$$(hg_2-hg_1)/gt_1=0.434 \tag{1}$$

$$|d_1-d_2|/F=0.099 \tag{2}$$

$$|rg_2/d_2|=1.424 \tag{3}$$

$$Lf/Lb=1.070 \tag{4}$$

FIGS. 11A-11D are each an aberration diagram for an optical system that includes the objective 5 and the tube lens 10. FIGS. 11A-11D indicate aberrations that occur on an image plane formed by the objective 5 and the tube lens 10. FIG. 11A is a spherical aberration diagram. FIG. 11B illustrates a sine-condition violation amount. FIG. 11C is an astigmatism diagram. FIG. 11D is a coma aberration diagram for an image height ratio of 0.7. In the present embodiment, as depicted in FIGS. 11A-11D, aberrations are corrected for a wide field of view in a preferable manner.

What is claimed is:

1. A dry objective comprising:
a first lens group that includes a plurality of meniscus lens components and has a positive refractive power;
a second lens group that includes a cemented lens, turns a pencil of diverging light from the first lens group into a pencil of converging light, and has a positive refractive power; and
a third lens group that includes a front group and a rear group and has a negative refractive power, the front and rear groups having concave surfaces adjacent to and facing each other, wherein:
an object, the first lens group, the second lens group, and the third lens group are arranged in this order,
the dry objective has a 30-fold magnification or lower and a numerical aperture of 0.75 or higher, and
the dry objective satisfies the following conditional expression:

$$0.43 \leq (hg_2-hg_1)/gt_1 \leq 0.9 \tag{1}$$

where
$gt_1$ indicates a thickness on an optical axis of a first lens component, the first lens component being a lens component of the rear group that is closest to the object,
$hg_1$ indicates a height of an axial marginal light ray at a lens surface of the first lens component that is closest to the object, and hg₂ indicates a height of the axial marginal light ray at a lens surface of the first lens component that is closest to an image.

2. The dry objective of claim 1, wherein:
each of the plurality of meniscus lens components comprises a single lens, and
the dry objective satisfies the following conditional expression:

$$|d_1-d_2|/F \leq 0.2 \quad (2)$$

where
$d_1$ indicates a thickness on the optical axis of a first meniscus lens component, the first meniscus lens component being a meniscus lens component that is closest to the object from among the plurality of meniscus lens components included in the first lens group,
$d_2$ indicates a thickness on the optical axis of a second meniscus lens component, the second meniscus lens component being a meniscus lens component that is second closest to the object from among the plurality of meniscus lens components included in the first lens group, and
F indicates a focal length of the dry objective.

3. The dry objective of claim 2, wherein the dry objective satisfies the following conditional expression:

$$1.3 \leq |rg_2/d_2| \leq 2.4 \quad (3)$$

where $rg_2$ indicates a radius of curvature of a lens surface of the second meniscus lens component on an image side.

4. The dry objective of claim 1, wherein:
the rear group includes at least two lens components, and
the dry objective satisfies the following conditional expression:

$$0.6 \leq Lf/Lb \leq 1.6 \quad (4)$$

where Lf indicates a total length of the front group, and Lb indicates a total length of the rear group.

5. The dry objective of claim 2, wherein:
the rear group includes at least two lens components, and
the dry objective satisfies the following conditional expression:

$$0.6 \leq Lf/Lb \leq 1.6 \quad (4)$$

where Lf indicates a total length of the front group, and Lb indicates a total length of the rear group.

6. The dry objective of claim 3, wherein:
the rear group includes at least two lens components, and the dry objective satisfies the following conditional expression:

$$0.6 \leq Lf/Lb \leq 1.6 \quad (4)$$

where Lf indicates a total length of the front group, and Lb indicates a total length of the rear group.

7. The dry objective of claim 1, wherein:
the second lens group includes a cemented triplet lens consisting of a positive lens, a negative lens, and a positive lens, and the object, the positive lens, the negative lens, and the positive lens are arranged in this order.

8. The dry objective of claim 2, wherein:
the second lens group includes a cemented triplet lens consisting of a positive lens, a negative lens, and a positive lens, and
the object, the positive lens, the negative lens, and the positive lens are arranged in this order.

9. The dry objective of claim 3, wherein:
the second lens group includes a cemented triplet lens consisting of a positive lens, a negative lens, and a positive lens, and
the object, the positive lens, the negative lens, and the positive lens are arranged in this order.

10. The dry objective of claim 4, wherein:
the second lens group includes a cemented triplet lens consisting of a positive lens, a negative lens, and a positive lens, and
the object, the positive lens, the negative lens, and the positive lens are arranged in this order.

11. The dry objective of claim 5, wherein:
the second lens group includes a cemented triplet lens consisting of a positive lens, a negative lens, and a positive lens, and
the object, the positive lens, the negative lens, and the positive lens are arranged in this order.

12. The dry objective of claim 6, wherein:
the second lens group includes a cemented triplet lens consisting of a positive lens, a negative lens, and a positive lens, and
the object, the positive lens, the negative lens, and the positive lens are arranged in this order.

13. The dry objective of claim 1, wherein the third lens group includes a Double Gauss.

14. The dry objective of claim 2, wherein the third lens group includes a Double Gauss.

15. The dry objective of claim 3, wherein the third lens group includes a Double Gauss.

16. The dry objective of claim 4, wherein the third lens group includes a Double Gauss.

17. The dry objective of claim 1, wherein the dry objective satisfies the following conditional expression:

$$57.6 \leq vd_1 \leq 87.3 \quad (5)$$

where $vd_1$ indicates an Abbe number that a lens of the dry objective that is closest to the object has for a d line.

18. The dry objective of claim 1, wherein the dry objective satisfies the following conditional expression:

$$0.440 \leq \Delta hg \leq 0.453 \quad (6)$$

where $\Delta hg$ indicates a partial dispersion ratio that a lens of the dry objective that is closest to the object has for an h line.

19. A dry objective with a 30-fold magnification or lower and a numerical aperture of 0.75 or higher, the dry objective comprising:
a first lens group that includes a plurality of meniscus lens components and has a positive refractive power;
a second lens group that includes a cemented lens, turns a pencil of diverging light from the first lens group into a pencil of converging light, and has a positive refractive power; and
a third lens group that includes a front group and a rear group and has a negative refractive power, the front and rear groups having concave surfaces adjacent to and facing each other,
wherein:
an object, the first lens group, the second lens group, and the third lens group are arranged in this order, and
the dry objective satisfies the following conditional expression:

$$57.6 \leq vd_1 \leq 87.3 \quad (5)$$

where $vd_1$ indicates an Abbe number that a lens of the dry objective that is closest to the object has for a d line.

20. The dry objective of claim 19, wherein the dry objective satisfies the following conditional expression:

$$0.440 \leq \Delta hg \leq 0.453 \quad (6)$$

where $\Delta hg$ indicates a partial dispersion ratio that a lens of the dry objective that is closest to the object has for an h line.

\* \* \* \* \*